United States Patent [19]

Frank et al.

[11] 4,113,621

[45] Sep. 12, 1978

[54] HYDRAULIC APPARATUS

[75] Inventors: Earl E. Frank, Tallman, N.Y.; Bing S. Yee, Paramus, N.J.

[73] Assignee: Abex Corporation, New York, N.Y.

[21] Appl. No.: 724,720

[22] Filed: Sep. 20, 1976

Related U.S. Application Data

[62] Division of Ser. No. 630,155, Nov. 10, 1975, Pat. No. 4,027,595.

[51] Int. Cl.$^2$ .......... B01D 33/40

[52] U.S. Cl. .......... 210/167; 210/256; 210/416 R

[58] Field of Search .......... 210/74, 87, 90, 103, 210/108, 130, 132, 167, 195 R, 197, 305, 320, 416, 521, 522, 100

[56] References Cited

U.S. PATENT DOCUMENTS

| | | | |
|---|---|---|---|
| 2,632,566 | 3/1953 | Morrison | 210/100 |
| 3,265,212 | 8/1966 | Bonsall, Jr. | 210/167 X |
| 3,517,815 | 6/1970 | Bolton et al. | 210/521 X |
| 3,667,603 | 6/1972 | Courson | 210/167 |
| 3,936,379 | 2/1976 | McCabe | 210/132 |
| 3,945,208 | 3/1976 | O'Connor | 210/167 |
| 4,027,595 | 6/1977 | Flank et al. | 210/137 |

*Primary Examiner*—Theodore A. Granger

*Attorney, Agent, or Firm*—Kinzer, Plyer, Dorn & McEachran

[57] ABSTRACT

A hydraulic system having a plurality of motor driven pumps in parallel legs, at least one being active and one in reserve, so combined with sensors to sense pump efficiency and filter efficiency that a condition deemed pump failure or filter failure results in activating the reserve leg and deactivating the inefficient leg. Other sensors detect flow meter failure and establish warnings of conditions deemed near-failure. The system may be duplicated both on the pressure side and return side of the pumps.

The system reservoir is characterized by a tank for return fluid to be cleaned and a separate tank for the fluid to be delivered under pressure; so constructed as to (a) remove turbulence, (b) prevent vortex overlap, (c) remove silt fines and (d) maintain a proper pumping level.

17 Claims, 14 Drawing Figures

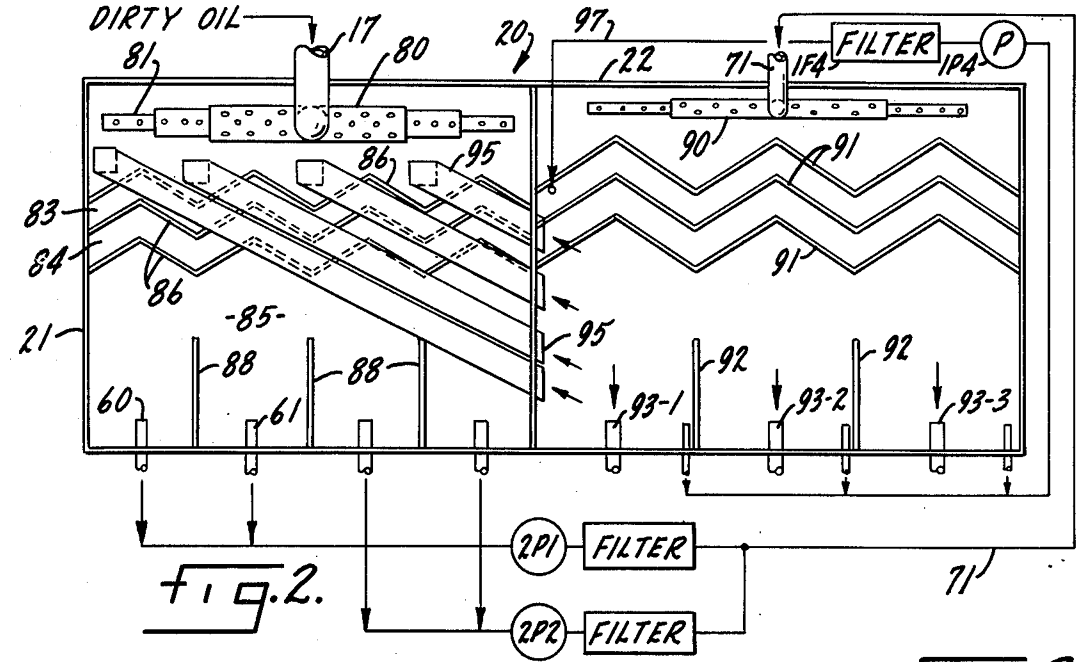
Fig. 2.
Fig. 3.
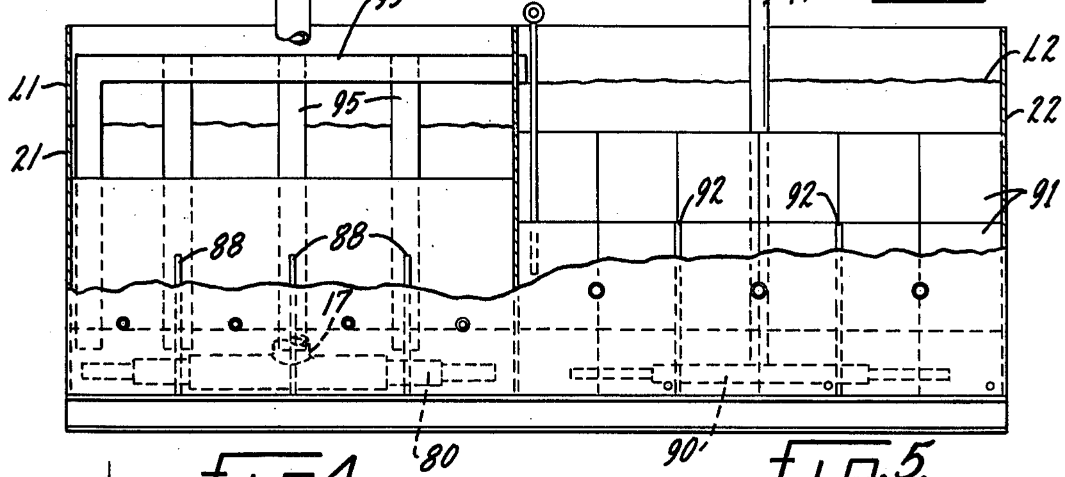
Fig. 4.
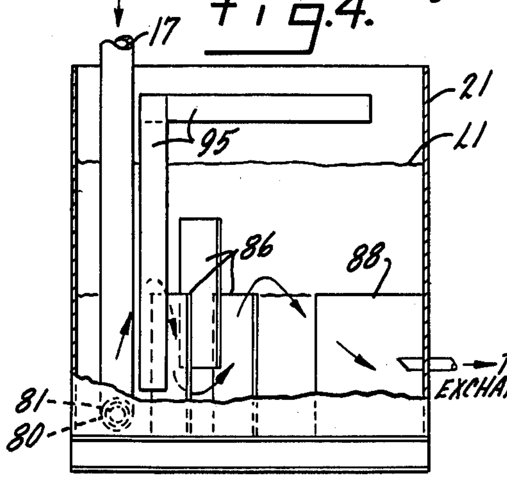
Fig. 5.
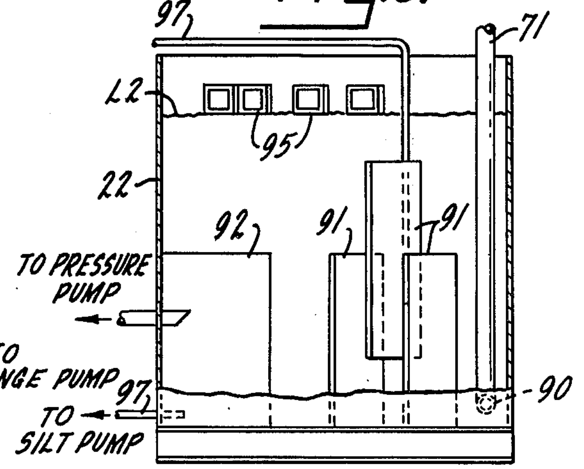

22
71
70
2FM1-S2
(FAILED PUMP)
2FM1-S3
(FAILED METER)
2FM1-S1
(FAILING PUMP)
2FM1
2F3-S2
2F3-S1
68
2F3
63
64
65
66
2P1
2M1
2P2
2M2
2P1-A
2P1-B
2F1-S1 (FAILING)
2F1
2F2
2F2-S1
2F1-S2
(FAILED)
60
61
2F2-S2
21
UNFILTERED TANK-RETURN

HYDRAULIC APPARATUS

This is a division of application Ser. No. 630,155, filed Nov. 10, 1975, now U.S. Pat. No. 4,027,595.

This invention relates to hydraulic apparatus principally intended to supply hydraulic requirements for retarders in a railroad classification yard.

Railroad cars are segregated according to destination in a railroad classification yard. The cars to be classified or separated according to destination are switched to the various classification tracks. It is customary to slow the cars to a safe coupling speed by means of retarders installed at predetermined positions along the classification tracks. Hydraulic controls are usually employed. U.S. Pat. Nos. 3,227,246 and 3,809,188 disclose retarders which employ hydraulic cylinders.

The hydraulic requirements are very extensive since the hydraulic fluid must be transmitted under pressure over a considerable distance. The required force is of considerable magnitude. If there is a pressure failure, the car cannot be brought to a safe speed, in which event the car couplers and the lading as well can be damaged.

The primary object of the present invention is to reduce the possibility of such damage by incorporating in the hydraulic system a redundant arrangement of pumps and related filter units and to constantly monitor performance to detect both failing (decaying) and failure conditions in terms of pump and filter efficiency, enabling remedial action to be timely applied. Another object of the invention is to incorporate in the system a reserve unit which is automatically operated in the event a failure is detected, while concurrently disabling the failed unit. Another object of the invention is to create warning signals in the event a near failure condition is detected.

Specifically, it is an object of the invention to monitor filter efficiency, activating a reserve pump and disabling the active pump (or pumps) in the event a threshold of pump failure is detected or in the event a predetermined level of declining filter efficiency is detected. A further object of the invention in this regard is to employ in redundant relation two active pumps and a single reserve pump, together with related filter units, such that in the event both active units are sensed as being in a failed condition, the reserve unit may be relied on for a limited time.

Other objects of the invention are to utilize a flow meter to determine if a pump is either in a failing condition or has failed; to sense the pressure drop across the filter by means of differential pressure switches responsive to complete filter failure or a failing (decaying) filter condition; to enable the failing or failed condition to be remedied by relying on a reserve pump and filter unit; and to enable appropriate signals to be created so that the operator of the classification yard may be aware of the downstream circumstances.

A reliable and efficient pump operation requires clean hydraulic fluid. Contamination results in pump wear and filter inefficiency. Accordingly, another object of the invention is to employ exchange pumps for delivering the unfiltered hydraulic fluid to exchange filter units prior to delivering the return fluid to the reservoir tank which supplies the pressure pumps. The exchange pumps and the exchange filters preferably incorporate the redundant features imposed on the pressure pumps.

Since contamination particles break up when the fluid is pumped and become smaler in size, it is possible for the clean side of the reservoir to be contaminated with exceedingly fine but nonetheless destructive particles which are not captured by the exchange filters. Accordingly, additional objects of the invention are to utilize a silt pump and silt filter at the clean side of the reservoir and to construct a reservoir which both eliminates turbulence and which accounts for a highly efficient transfer of fluid.

In the drawing:

FIG. 2 is a plan view of an oil reservoir and FIGS. 3, 4 and 5 are sectional views thereof;

Figure 1:
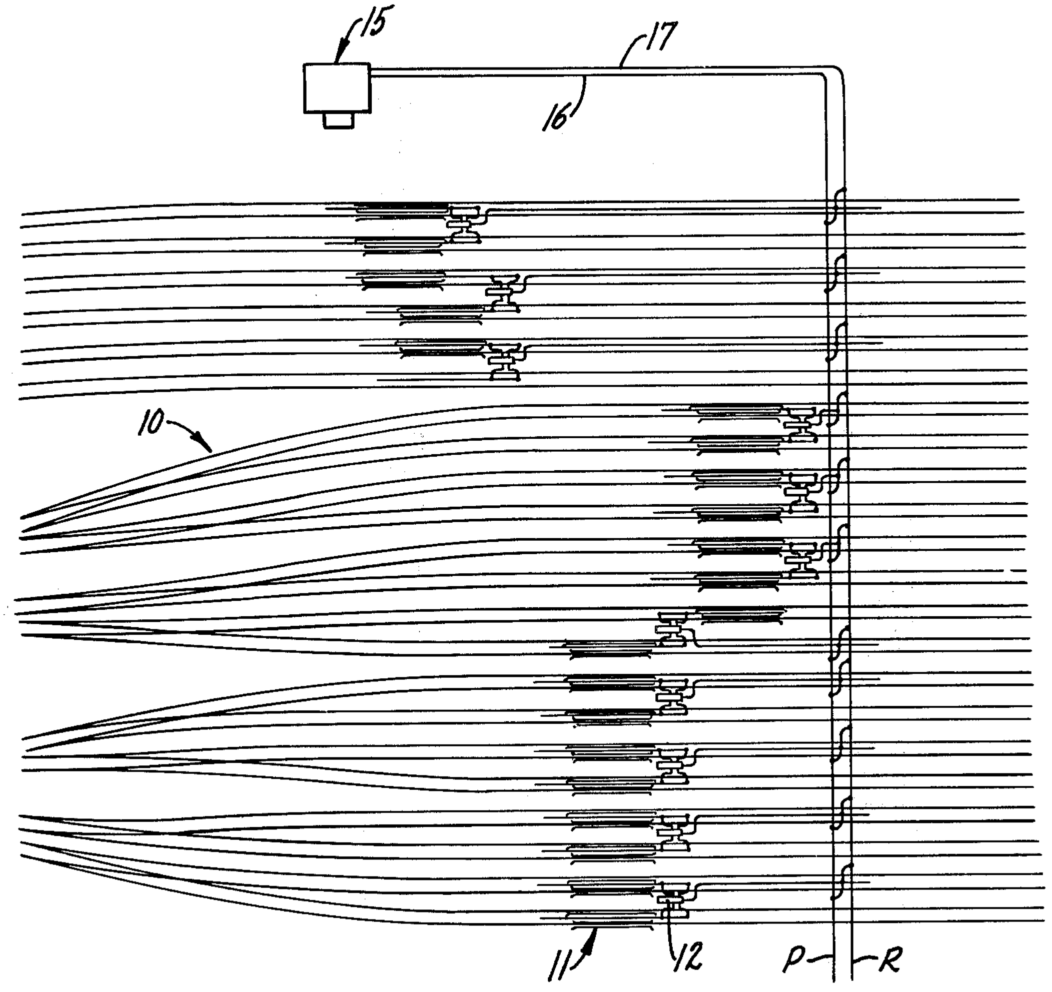
FIG. 1 is a schematic view of a railroad classification yard.

FIG. 1 of the drawing is a schematic view of a typical retarder installation in a railroad classification yard. The classification tracks are identified by reference character 10. On the up-stream side there is a so-called hump (not shown) where an operator at a console assigns the individual cars to a selected one of the classification tracks. The car to be classified accelerates down the grade of the hump, by gravity fall, and is automatically switched to a particular classification track.

The individual retarders are identified by reference character 11. The retarder controls include cylinders, not shown herein but of the character disclosed in U.S. Pat. Nos. 3,227,246 and 3,809,188. Hydraulic fluid for the cylinders is pressurized by accumulators 12 and these accumulators in turn are charged by fluid under pressure furnished by a pump housing 15. The pressure line for charging the accumulators is identified by reference character 16. The exhaust fluid, exhausted from the retarder cylinders after use, is returned to the pump housing through the return conduit 17.

It will be appreciated from what is shown in FIG. 1 that the hydraulic requirements are immense. Huge volumes of fluid under pressure are circulated over a considerable distance, resulting in pump wear seldom encountered elsewhere. The chances for contaminated hydraulic fluid are quite large. Consequently, the factors of pump wear and likelihood of contamination drastically effect reliability from the standpoint of sustained operation over a protracted period of time. Under the present invention, as will now be described, pump and filter performance are constantly monitored, not only to give warning of a decline in operating efficiency, but also to maintain operating efficiency in spite of a failed pump and/or a failed filter unit.

As shown in FIG. 2, a reservoir 20, located at the pump housing, is defined by a pair of adjacent tanks 21 and 22, the construction of which will be described in more detail below. For the present, it is sufficient to point out that oil returned from the retarder system is delivered to tank 21, filtered and transferred to tank 22 which contains the supply of hydraulic fluid for the pressure pumps.

Figure 6:
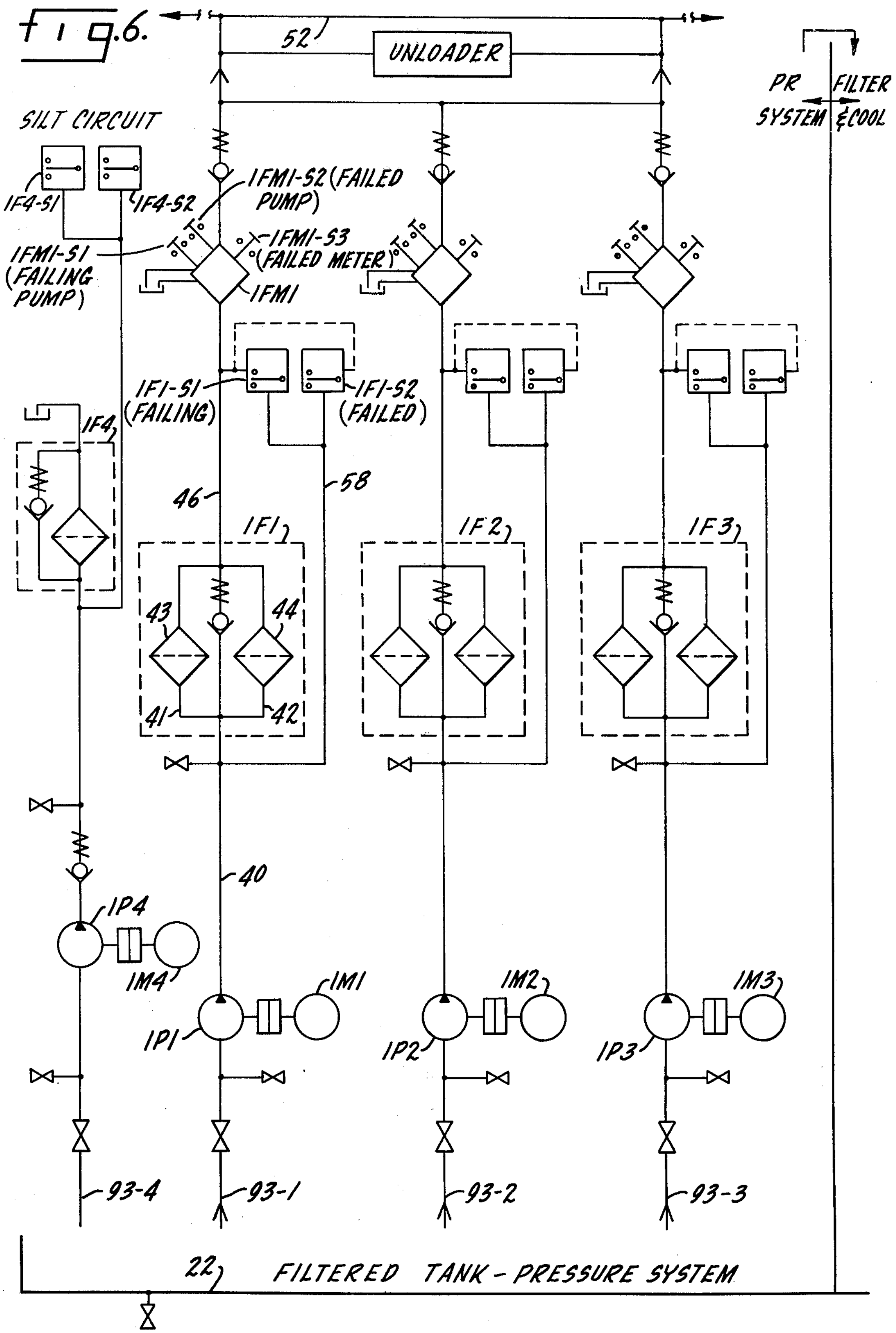
FIGS. 6 and 7 are schematic views of hydraulic circuitry.

The pressure pumps and associated filter units are shown in FIG. 6. Three motor operated pumps 1P1, 1P2 and 1P3 are arranged in parallel with three associated filter units, 1F1, 1F2 and 1F3. In normal operation only two of the pumps will be active, say pumps 1P1 and 1P2, while the third pump and its associated filter unit constitute a reservoir unit.

Each pump delivers hydrualic fluid under pressure through an outlet 40 and this outlet is branched at 41 and 42 to deliver fluid under pressure to a pair of parallel filter elements 43 and 44, collectively constituting the filter unit. In turn, the outlets of the filter elements are connected to a common conduit 46 leading to a flow meter 1FM1. The outlet of each flow meter is connected to a common manifold 52 representing the pressure line 16 identified in FIG. 1.

The filter elements are adapted to filter contaminants of fifteen micron size or larger.

Efficiency of each filter unit is constantly monitored or sensed by a pair of differential pressure switches 1F1-S1 and 1F1-S2 and to this end the pressure switches are interposed in a conduit 58 connected at its opposit ends respectively to the downstream and upstream conduits 40 and 46.

As the filter elements become contaminated by the filtered particles, the pressure rises although the rate of delivery by the pump will remain constant. Pressure switch 1F1-S1 is normally open but is pre-set to close when the pressure of the hydraulic fluid being circulated rises to a value representative of a marginal filter condition, that is, indicative of a decaying filter of declining effectiveness, approaching a fully inoperative condition, say a 30% contamination level. When switch 1F1-S1 closes a warning signal is given, either by lighting a lamp or sounding a buzzer so that the operator in the hump tower is warned of imminent filter failure.

Switch 1F1-S2 on the other hand is pre-set to close when the pressure drop across the filter unit reaches an abnormally high value indicative of an unacceptable filter condition, say an 80% contamination level. When switch 1F1-S2 closes, the motor 1M1 for driving the associated pump is de-energized to deactivate the pump.

It may be mentioned at this point that the monitoring means for each pressure pump is identical and consequently to avoid nedless repetition the reference characters are only selectively applied.

When a pump is deactivated because of a failed filter, the reserve pump is placed on stream by energizing its motor as will be explained.

Each flow meter is equipped with three switches: one to identify a failed flow meter (1FM1-S3), one to identify that the pump is delivering fluid at a marginal rate, near failure (1FM1-S1), and one to identify that the flow rate is so low that the pump is deemed to be in a wholly ineffective state, switch 1FM1-S2.

The flow meter is of known form and incorporates an element (not shown) for measuring the rate of flow. If the element itself fails, switch 1FM1-S3 is actuated to preclude needlessly servicing the pump. On the other hand if the meter element which measures flow reflects a flow rate approaching an unacceptable pump efficiency level (say 80% effective) switch 1FM1-S1 closes in response thereto; and if the meter element reflects a flow rate so low that the pump is deemed in a failed condition (say 70%) switch 1FM1-S2 closes in response thereto. If either switch 1FM1-S3 or 1FM1-S2 closes in response to a condition deemed "failed", its pump is disabled and the reserve pump is actuated. If switch 1FM1-S1 is actuated, a warning is given that the pump is in a near fail state.

Figure 7:
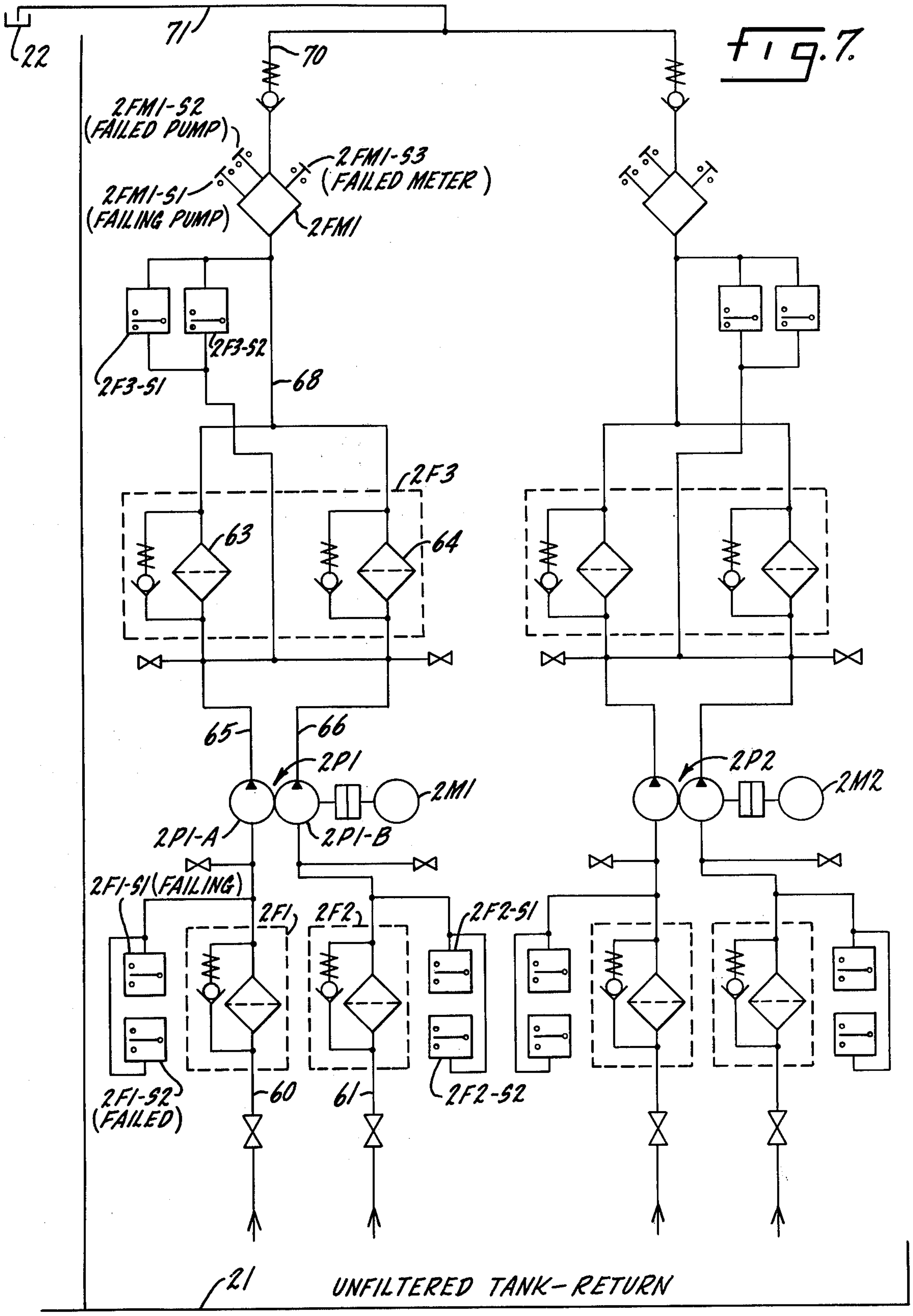

The exchange pump and filter system is similar, FIG. 7, but only two pumping units, rather than three, are involved, one for normal operation (2P1) and (2P2) for emergency in case the other fails. The exchange pump units are preferably embodied in tandem pumps as 2P1-A and 2P1-B having a common shaft driven by one motor as 2M1.

Each pump as 2P1 withdraws from tank 21 the fluid returned from the retarder cylinders. This unfiltered fluid is delivered by a pair of separate conduits 60 and 61 first to a pair of related filter units 2F1 and 2F2 (40 micron filter size) and from thence to a filter unit 2F3 having two parallel filter elements 63 and 64 (15 micron size) connected by respective conduits 65 and 66 to the outlets of the pumps 2P1-A and 2P1-B.

The fluid filtered at 2F3 is delivered by a conduit 68 to a flow meter 2FM1 and from thence to conduits 70 and 71 which feed tank 22 at the pressure side of the pump housing.

Efficiency of the filter units 2F1 and 2F2 is monitored by vacum switches 2F1-S1 and 2F2-S1 to detect a failing or marginal condition defined above; likewise as to switch 2F3-S1 for filter unit 2F3. Vacuum switches 2F1-S2, 2F2-S2 and 2F3-S2 monitor the filters for a failed condition as defined above.

If one of the switches 2F1-S1, 2F2-S1 or 2F3-S1 is actuated a warning is given and if one of the switches 2F1-S2, 2F2-S2 or 2F3-S2 is actuated, the pumping unit 2P1 is disabled and the other pumping unit 2P2 is automatically placed on stream as will be explained.

The flow meter 2FM1 monitors pump performance. It is equipped with three switches: one to identify a failed flow meter condition (switch 2FM1-S3), one to identify that the pump is delivering fluid at a marginal rate, near failure (2FM1-S1) and one to identify that the flow rate is so low the pump is deemed to be in a failed state, switch 2FM1-S2.

If the measuring element of the flow meter itself fails, switch 2FM1-S3 is actuated to preclude needlessly servicing the pump. If the flow meter reflects a flow rate approaching an unacceptable pump efficiency level switch 2FM1-S1 closes in response thereto; and if the meter reflects a flow rate so low that pump 2P1 is deemed in a failed condition switch 2FM1-S2 closes in response thereto. If either switch 2FM1-S3 or 2FM1-S2 closes in response to a condition deemed "failed", pump 2P1 is disabled and the reserve pump 2P2 is actuated. If switch 2FM1-S1 is actuated, a warning is given that the pump is in a near fail state.

The construction of the reservoir is shown in FIGS. 2, 3, 4 and 5. Tank 21 receives from return conduit 17 the unfiltered oil returned from the retarder cylinders. The return oil is under a great deal of pressure and is preferably delivered to a submerged diffuser 80, inside tank 21, FIG. 2. The diffuser, constituting the outlet of return conduit 17, has perforated hollow sleeves which separate the stream of return fluid into numerous jet sprays within a diffuser outlet chamber 81 of tank 21. Energy is thus removed.

The tank 21 is further divided into a plurality of chambers 83, 84 and 85 by serpentine baffles 86 which reduce turbulence, further reducing the energy level. There are three baffles and as shown in FIG. 4 the medial one is elevated above the bottom of the tank to induce a tortuous flow between the chambers defined by the spaced baffles.

Chamber 85 of tank 21 containing the unfiltered oil is tapped by the conduits as 60 and 61 which feed the exchange pump and filters. The inlets or entry ports of these conduits are isolated from one another by dividers as 88, preventing the formation of interfering vortexes due to the suction effect of the exchange pump leg.

The active exchange pump (2P1 or 2P2, FIG. 2) delivers filtered oil through a transfer conduit 71 which terminates in another diffuser 90 (outlet) submerged in the second or pressure tank 22 which constitutes the reservoir for the pressure pump leg. Tank 22 is also equipped with serpentine baffles 91 to remove turbulence, and is also equipped with divider plates 92 which isolate the inlets to the three conduits 93-1, 93-2 and 93-3, FIG. 2, which supply the respective pressure pumps 1P1, 1P2 and 1P3, FIG. 6, again for the purpose of preventing vortex overlap.

In order to remove exceedingly fine particles, a slit or slurry pump circuit is employed. This circuit or leg comprises a pump 1P4, FIG. 2, and related filter unit 1F4 (three micron size), FIGS. 2 and 6. The silt pump withdraws filtered oil from tank 22 and returns it to tank 22 through conduit 97 as shown in FIG. 2.

To maintain a constant interchange between filtered and unfiltered oil, overflow pipes 95 are positioned to tap oil at level L2 of tank 22, returning filtered oil to tank 21 having a lower level L1. The different levels are a manifestation of the requirement that the exchange pump must deliver oil at a rate greater than the rate of extraction by the pressure pumps.

ELECTRICAL CONTROL

A. NORMAL MODE

Figure 8:
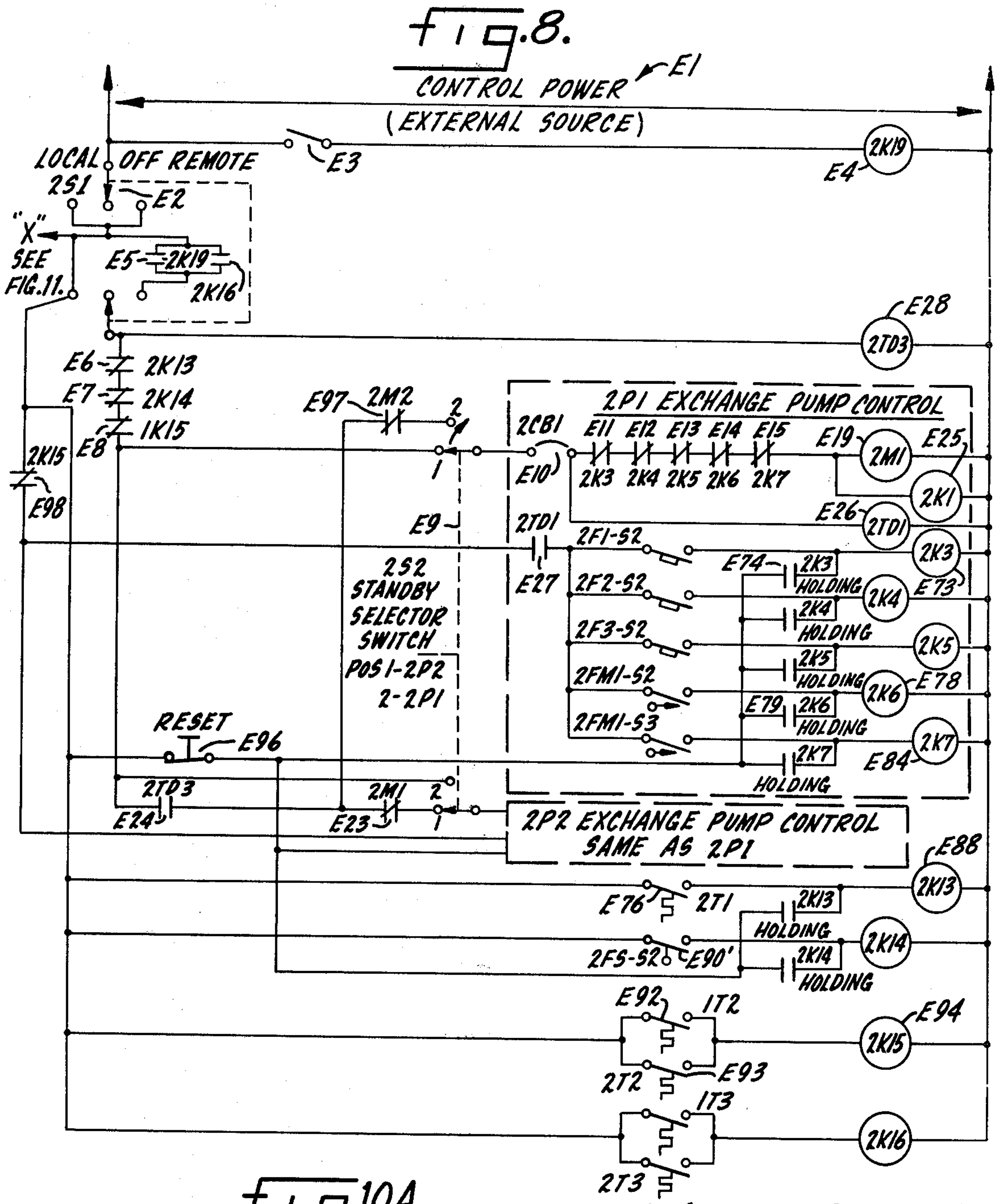
FIGS. 8 through 13 are wiring diagrams.

The motor-operated pump control power source E1, FIG. 8, is connected to hand-operated 3-position and 3-pole rotary selector switch E2. This selector switch has three functions: Local, Off and Remote. Local position is primarily used for pumping system start up and maintenance. The Off position is used to remove all electrical control power from the pumping station. Remote position is used to operate the pumping station from any convenient location.

With switch E2 on Remote position, close switch E3: energize control relay coil E4; relay contact E5 closes. Control current flows from power source E1 through selector switch E2, relay contact E5, normally closed relay contacts E6, E7 and E8, selector switch E9 (exchange pump standby selector switch, select any one of two positions) circuit breaker auxiliary contact E10 (hand operate), and normally closed control relay contacts E11, E13, E14 and E15. Exchange pump motor starter thermal overload contacts may be inserted. At this point in time, pump motor starter coil E19 is energized to close the main motor contactor E20. The motor-operated exchange pump 2P1 begins to operate.

Normally closed auxiliary contact E23 of main contactor E20 and time delay contact E24 are opened, preventing standby motor-operated exchange pump 2P2 from operating.

Control relay coil E25 is energized. The contacts of this relay, E25, FIG. 10, are used to control monitoring indicating lights.

Time delay relay coil E26 is energized. Delay contact E27 will close at a pre-determined time. The purpose of this relay is to prevent the failure detecting circuits from operating until pump speed and hydraulic oil flow are normalized. Time delay coil E28 is also energized.

Figure 11:
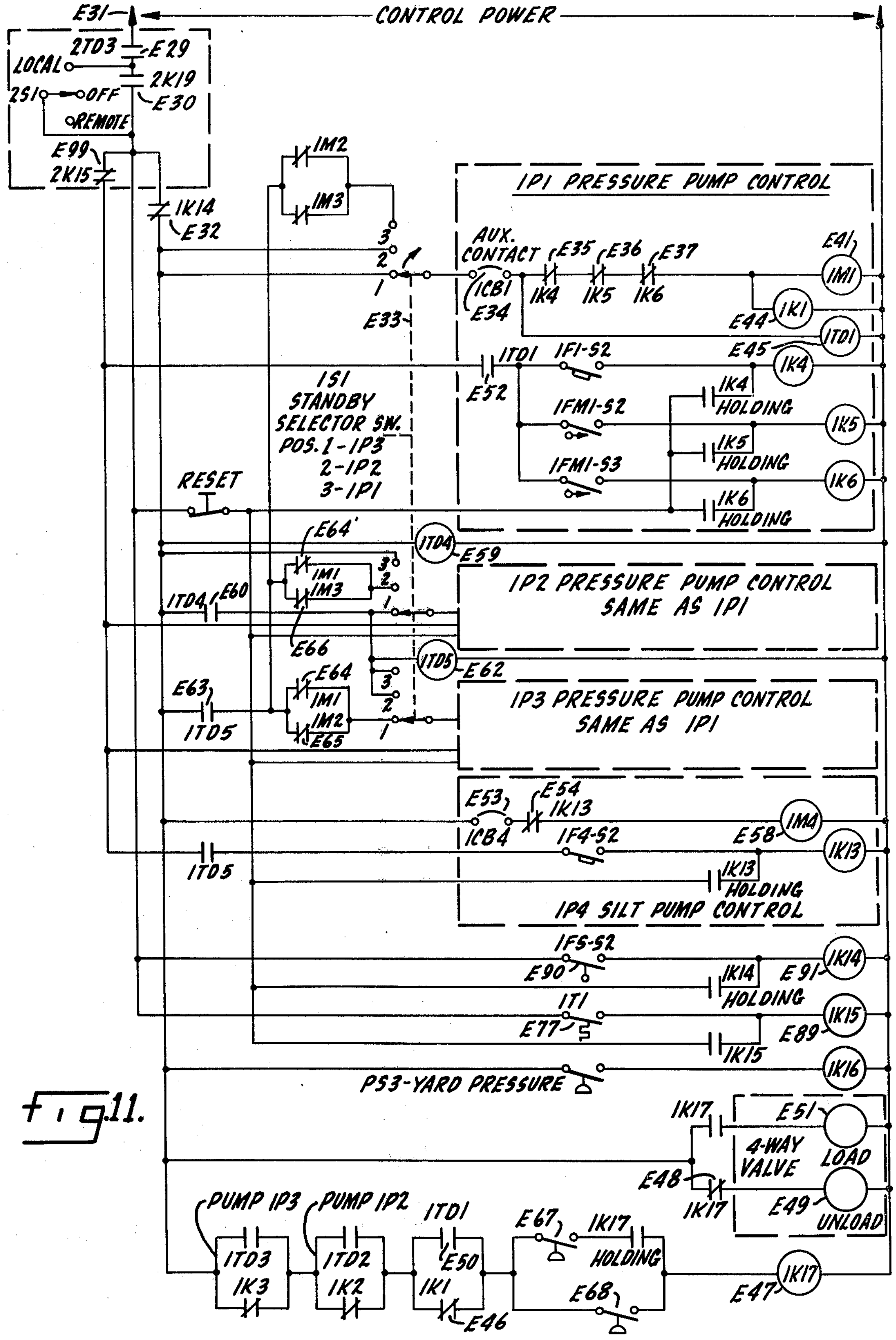
Figure 12:
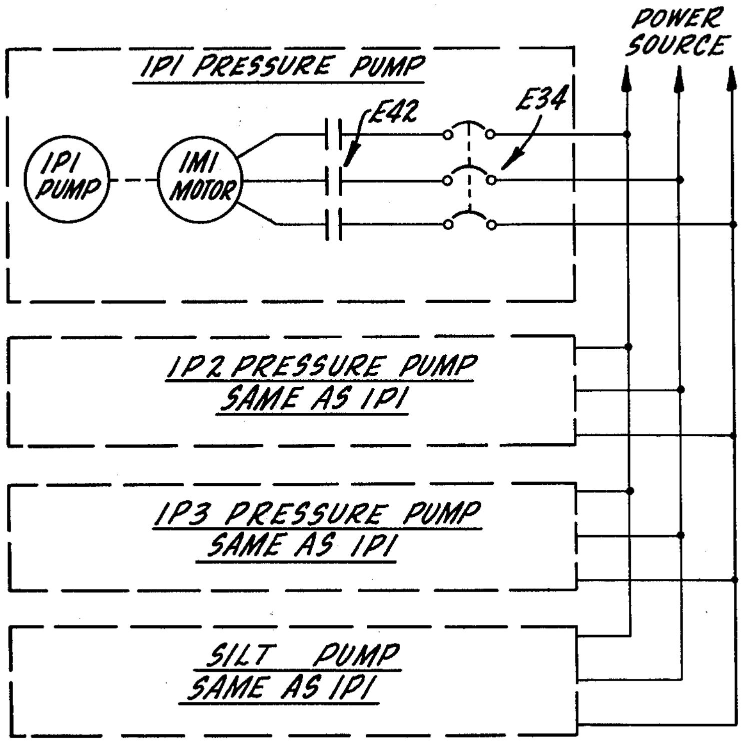

At a pre-determined time, relay contacts E24 and E29 will close. Relay contact E29 is shown in FIG. 11 and so are the othe relays, contacts and switches now to be described.

Since remote control relay coil E4 is already energized, relay contact E30 is also closed. Control current flows from control power E31 through time delay relay contact E29, remote control contact E30, control relay contact E32 and selector switch E33. The latter is the pressure pump standby selector, positioned in any one of three positions. Assume position 1 is selected: control current continues through circuit breaker auxiliary contact E34 (hand operate), and normally closed control relay contact E35, E36 and E37. Pressure pump motor starter thermal overload contacts may be inserted.

Pump motor starter coil E41 is energized and closes main contactor E42, whereupon motor-operated pressure pump 1P1 begins to operate.

At the same time control relay coils E44 and E45 are energized: open normally closed contact E46 to de-energize control relay coil E47, and through relay contact E48 energize the unloader solenoid valve E49. The unloader is shown schematically in FIG. 6. In this manner, there will be zero load on the pressure pump whenever there is a requirement for the pump to start up.

At a pre-determined time, delay contact E50 is closed, which allows the pressure system to cycle automatically from the unloading mode (solenoid valve E49 energized) to the loading mode where solenoid valve E51 is energized.

Time delay contact E52 will close at a pre-determined time. This delay closure will prevent the failure detecting circuits from operating until pump speed and hydraulic oil flow are normalized.

Motor-operated silt pump 1P4 will start to operate at the same time as pressure pump 1P1. Thus, control current flows through circuit breaker auxiliary contact E53 and control relay contact E54; starter coil E58 is energized, starting the silt pump.

While pressure pump 1P1 is in operation, time delay relay coil E59 is energized. After a pre-determined time delay, relay contact E60 is closed which permits control current to energize the second pressure pump 1P2. Time delay relay coil E62 and its contact E63 are used to prevent operation of the standby pressure pump 1P3. The reason for allowing only one pump to start at a time, except the silt pump, is to keep the starting current demand low.

In normal operation of the system, one of the pressure pumps is de-energized as a standby. To accomplish this, normally closed auxiliary contacts E64 and E65 are held open due to the main contactor coils being energized.

Summary of the normal mode operation is as follows:

a. Selector switch E2 on Remote position;
b. Standby exchange pump selector switch E9 in one of two positions. (For purpose of explanation, position 2P2 is selected, meaning exchange pump 2P2 is on standby.
c. Standby pressure pump selector switch in one of three positions. (For purpose of explanation, position No. 1 is selected placing pump 1P3 on reserve)
d. Turn switch E3 to On position.
e. Exchange pump 2P1 operates immediately; standby pump 2P2 remains inoperative.
f. After a time delay, pressure pump 1P1 and silt pump 1P4 automatically begin to operate; pressure pump 1P2 and standby pressure pump 1P3 remain inoperative.
g. After another time delay, pressure pump 1P2 begins to operate; standby pressure pump 1P3 remains inoperative.
h. Loading and unloading cycles are automatically controlled by pressure switches E67 and E68.

Switch E67 opens above 800 psi and switch E68 closes below 700 psi.

i. Normally, one exchange pump, two pressure pumps and the silt pump are always in operation. In the event of malfunction, the faulty pump will be disabled and the standby pump will be automatically set in operation.

B. WARNING MODE

Typical warning and failure modes will be described in detail for the exchange pumps 2P1 and 2P2, FIG. 10. Warning circuits of the same order are employed for the pressure pumps 1P1, 1P2 and1P3, FIG. 13, but will not be described in detail since they can be traced on the basis of the detailed explanation now to be given for the exchange pumps.

Contacts E25' of relay E25 aere closed, FIG. 8. When filter-operated switch 2F1-S1, FIG. 10 (and see FIG. 7) detects a pre-set limit of warning contamination in the leg of pump 2P1, switch 2F1-S1 closes, lighting lamp E70. Lamp E70 may be at the pump house. Relay coil 71 is energized for remote warning indication which may be located in the hump tower.

Warning switches for flow meter indication of a failing exchange pump, switch 2FM-S1 for pump 2P1, FIG. 10 (and see FIG. 7) establish warnings. The warning circuits do not cause a shift to the standby exchange pump, deemed to be pump 2P2. The same warnings for filter contamination and failing pump are imposed on the standby exchange pump 2P2, FIG. 8, the silt pump 1P4, FIG. 11, and the pressure pumps as shown in FIG. 8. Thus exchange pump 2P2, silt pump IP4 and each of the three pressure pumps are associated with a filter contamination warning switch (as 1F1-S1 for pressure pump IP1, FIG. 13) and a failing pump warning switch (as 1FM1-S1 for pressure pump IP1, FIG. 13).

C. FAILURE MODE

When filter-operated switch 2F1-S2, FIG. 8, detects a pre-set limit deemed to be a filter failure, the switch closes, energizing control relay coil E73 which closes relay (holding) contacts E74, FIG. 8, and E75, FIG. 10. The related warning lamp is thus held lit. Relay contact E11 opens, FIG. 8. The main contactor coil E19 is de-energized and the exchange pump 2P1 will be disabled.

Since main contactor coil E19 is de-energized as a result of contacts E11 opening upon energizing relay E73, auxiliary contact E23, FIG. 8, of main motor contactor returns to its normal closed position, causing standby motor-operated exchange pump 2P2 to operate. Holding contact E74 keeps relay E73 energized and prevents pump 2P1 from being restarted until after the highly contaminated filter 2F1, FIG. 7, in the leg of pump 2P1 is replaced thereby to de-energize relay coil E73.

Relay contact E75, FIG. 10, is used to light the related failure identification lamp and for remote warning indication.

The other filter failure switch 2F2-S2, FIG. 7, for exchange pump 2P1 operates in the same manner, equally true of the other exchange pump 2P2.

In the event of pump failure (detected at the flow meter) switch 2FM1-S2 is closed, FIGS. 7 and 8, energizing relay E78 and closing contacts E79 (holding) and E80. Lamp F81 lights for local warning. Contact E14 controlled by relay E78 opens, de-energizing coil E19 to stop pump 2P1. Contact E23 closes, placing the standby pump 2P2 in operation. Holding contact E74 prevents pump 2P1 from being restarted (that is, coil E78 is held energized to hold contacts E14 open) until it is repaired or replaced; reset by switch E96.

If the flow meter fails, switch 2FM1-S3 closes (see FIGS. 7 and 8) energizing relay E84. Contacts E15 open, pump 2P1 is disabled and lamp E85 is lit.

These operations also apply to the pressure pump legs in the filtered tank 22: failed filter switch 1F1-S2; failed pump switch 1FM1-S2; and failed flow meter switch 1FM1-S3.

When the falure has been corrected in the leg represented by pump 2P1, selector switch E9, FIG. 8, is repositioned to position No. 2 to place pump 2P1 in automatic standby. Reset switch E96 is actuated to drop out relay E83, extinguishing the indicator lamp. With switch E9 in position No. 2, relay E19 will be energized to start motor 2M1 only in the event pump 2P2 is disabled because of a failure, resulting in a closure of contacts E97 normally open so long as motor 2M2 is operating.

D. SYSTEM FAILURE MODE OPERATION

Aside from a power failure, the following conditions are considered as an entire system failure as shown in FIG. 10:

a. two exchange pumps failed (contacts 2K1 and 2K2);

b. three pressure pumps failed (contacts 1K1, 1K2 and 1K3); or c. yard pressure failed (see switch PS-3, FIG. 11) meaning relay 1K16 is de-energized, opening contacts 1K16.

E. SUMMARY OF WARNING AND FAILED MODES

All pumps (pressure, exchange, and silt or slurry) deliver through a filter having a sensing means in the form of a pressure differential switch to detect both a filter condition approaching unacceptable contamination (warning) and a completely unacceptable level of filter contamination. The latter is deemed a filter failure. These conditions have been described in detail for the exchange pump system and can be traced for the pressure pumps.

In the event a failing pump, detected at the flow meter, warning is also given in the exchange pump and pressure pump legs.

Figure 13:
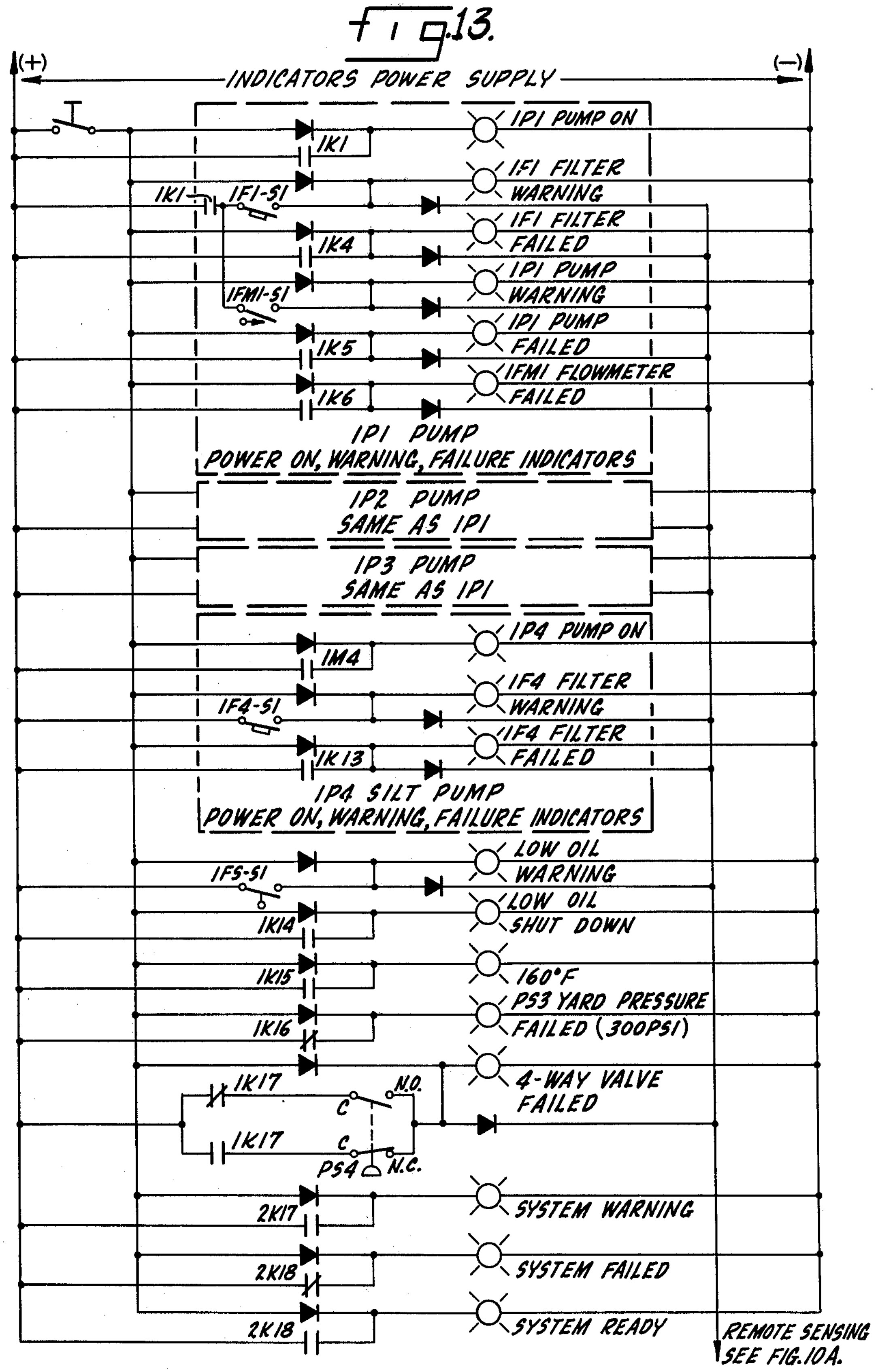

In the instance of the silt pump IP4, it can also be seen in FIG. 13 there is a filter operated switch 1F4-S1 for warning of a near failure and as shown in FIG. 11 there is a second filter switch 1F4-S2 for sensing a failed filter in the silt pump leg. If this latter switch is operated, relay 1K14 is energized; its contacts 1K13, FIG. 13, are closed to light a lamp.

There is no standby silt pump; nor does the silt pump leg include means to detect either a failing pump or a complete pump failure. On the other hand, if a filter for the operative exchange pump fails (e.g. 2P1) or if its motor or flow-meter fails:

a. one of four relays is energized, FIG. 8: 2K3, 2K4, 2K6 or 2K7;

b. the related relay contacts open to disable the pump motor, FIG. 8;

c. contacts E23 (open when pump motor 2MI is energized) revert to closed position, placing the motor of pump 2P2 in operation;

d. the failed condition is corrected; and e. switch E9 is set to No. 2 position, readying pump 2P1 as the standby.

As for the pressure pump system in a failed mode, and assuming selector switch E9 (FIG. 11) set to position No. 1 (which assigns pump IP3 the standby role) motor relay contacts E64 and E64' (pump motor 1M1) are open as long as the motor for pump 1P1 is energized, and relay contacts E65 (motor for pump 1P2) are also open.

Now if any one of the failure mode switches in the leg of pump 1P1 is actuated (1F1-S2 or 1FM1-S2 or 1FM1-S3) and with contacts E60 and E63 closed;

a. relay 1K4, 1K5 or 1K6 is energized and its contacts open;
b. motor relay 1M1 (E41) is thereby de-energized and its contacts are reversed (e.g. contacts E64 and E64' close);
c. contacts E65 are open because it is assumed there is no failure in the leg of pump 1P2 but since motor relay 1M1 is de-energized its contacts E64 close, placing pump 1P3 on stream;
d. concurrently contacts E64' close and the contacts E66 of the motor relay for the motor of pump 1P3 open, so that
e. pumps 1P2 and 1P3 are on stream.

The falure in the leg of pump 1P1 is remedied and the selector switch may be set to No. 2 position, which readies pump 1P2 to be the standby.

When a predetermined high temperature (say 160° F) is reached either in the unfiltered tank 21 or filtered tank 22 a related thermal switch E76 (FIG. 8) located in tank 21 (return oil) or E77 (FIG. 11) located in tank 22 is closed to energize relay coil E88 or E89, opening normally closed contact E6 or E8, FIG. 8, to disable the exchange pumps. Nonetheless, the pressure pumps will remain in operation until a low oil switch E90, FIG. 11, located in tank 22, is activated to energize relay coil E91, opening relay contact E32, FIG. 11. A low oil switch E90 is also located in the unfiltered tank 21, FIG. 8. From the time a high temperature condition is detected until the entire system is shut down is approximately 2 minutes.

If desired, heat exchange fans may be used to keep the oil cool but nonetheless the high temperature and low oil sensors will be used.

When a predetermined low temperature (say −20°F) is reached either in the unfiltered tank or filtered tank, switch E92 or E93, FIG. 8, is closed to energize relay coil E94, FIG. 8, opening relay contacts E98 (FIG. 8) and E99 (FIG. 11) to de-activate the filter and flowmeter fault monitoring circuits. This avoids faulty indications due to the viscosity of the oil at low temperature. The exchange and pressure pumps will remain in operation; a warning light is lit locally and remotely.

The lamp circuitry shown in FIGS. 10 and 13 may be extended to signal high and low temperatures, low oil and oil over-fill.

The unloader, FIG. 6, is employed to allow the pressure pumps to start against a no-load condition as already explained. At the commencement of start-up, contacts E46, FIG. 11, open when relay E45 is energized, de-energizing relay E47 and allowing its contacts E48 to revert to the normally closed condition. As a consequence the 4-way unloader valve is opened and there is no resistance to the pressure pumps.

Switch E68 is closed (closed below 700 psi) so when the time delay contacts E50 close, relay E47 is energized and its contacts reverse, energizing solenoid valve E51 to place the 4-way valve in the system loading mode.

It will be seen from the foregoing that oil, used to operate the retarders, is returned to tank 21. Turbulence is removed by the baffles 86 prior to the return oil entering the inlet ports which communicate with the exchange pump.

The exchange pump (2P1 or 2P2) sends the oil through a filter (see FIG. 2) and the filtered oil is delivered to an outlet in the second tank by means of a transfer conduit 71.

Turbulence of oil in the second tank is removed by baffles 91. Very fine particles of contaminant in the oil, not removed by the exchange pump filters, are removed by a filter 1F4 serviced by a pump 1P4, both interposed in a recirculating conduit 97, FIG. 2.

Oil is pumped from tank 22 by a plurality of activated pressure pumps. To prevent vortex overlap, the inlets to the pressure pumps are isolated from one another by dividers 92, FIG. 2. The same arrangement is employed (dividers 88) for the exchange pump inlets.

If a pressure pump (or exchange pump) fails, the reserve pump is activated and the failed pump is deactivated, automatically. The same automatic switch-over occurs in the instance of a failed flow meter or failed filter in a pressure pump leg or an exchange pump leg.

Such automatic corrections occur as an incident to operation of a sensing means as switch 1FM1-S2, FIG. 6, which senses flow rate; switch 1FM1-S3 which detects failure of the flow meter measuring elements and switch 1F1-S2 which senses pressure drop across the related filter.

Figure 9:
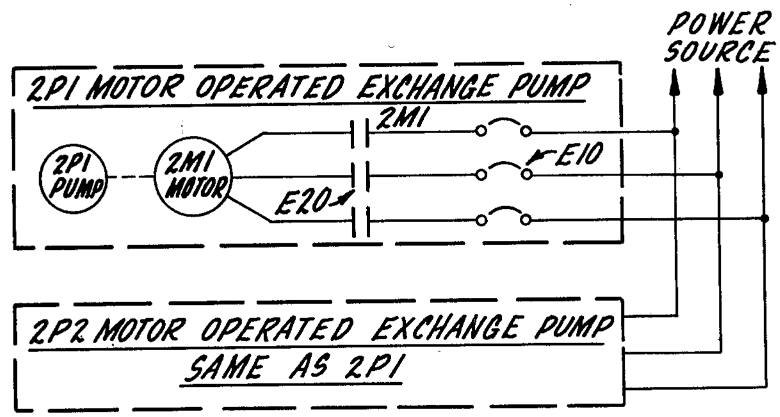

If a failed condition is sensed, a relay is energized; such as relay E73, FIG. 8, and a warning is given, e.g. a lamp is lit. At the same time, corresponding motor relay contacts such as contacts E20, FIG. 9, are opened to disable the pump and other motor relay contacts are closed to activate the reserve pump.

When a sensing means detects a pump or filter is nearing failure, a warning is given.

Figure 10A:
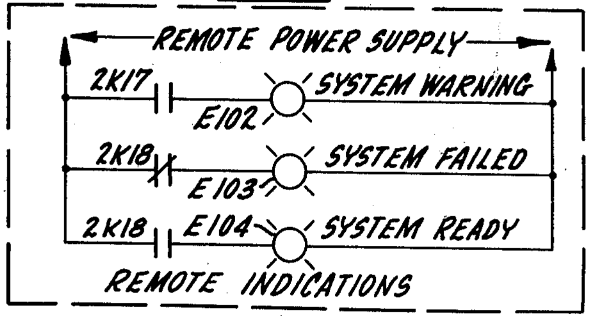
Figure 10A:
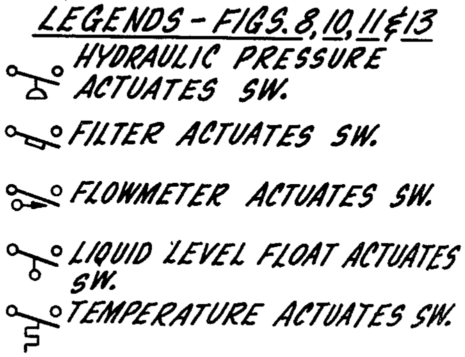
Figure 10:
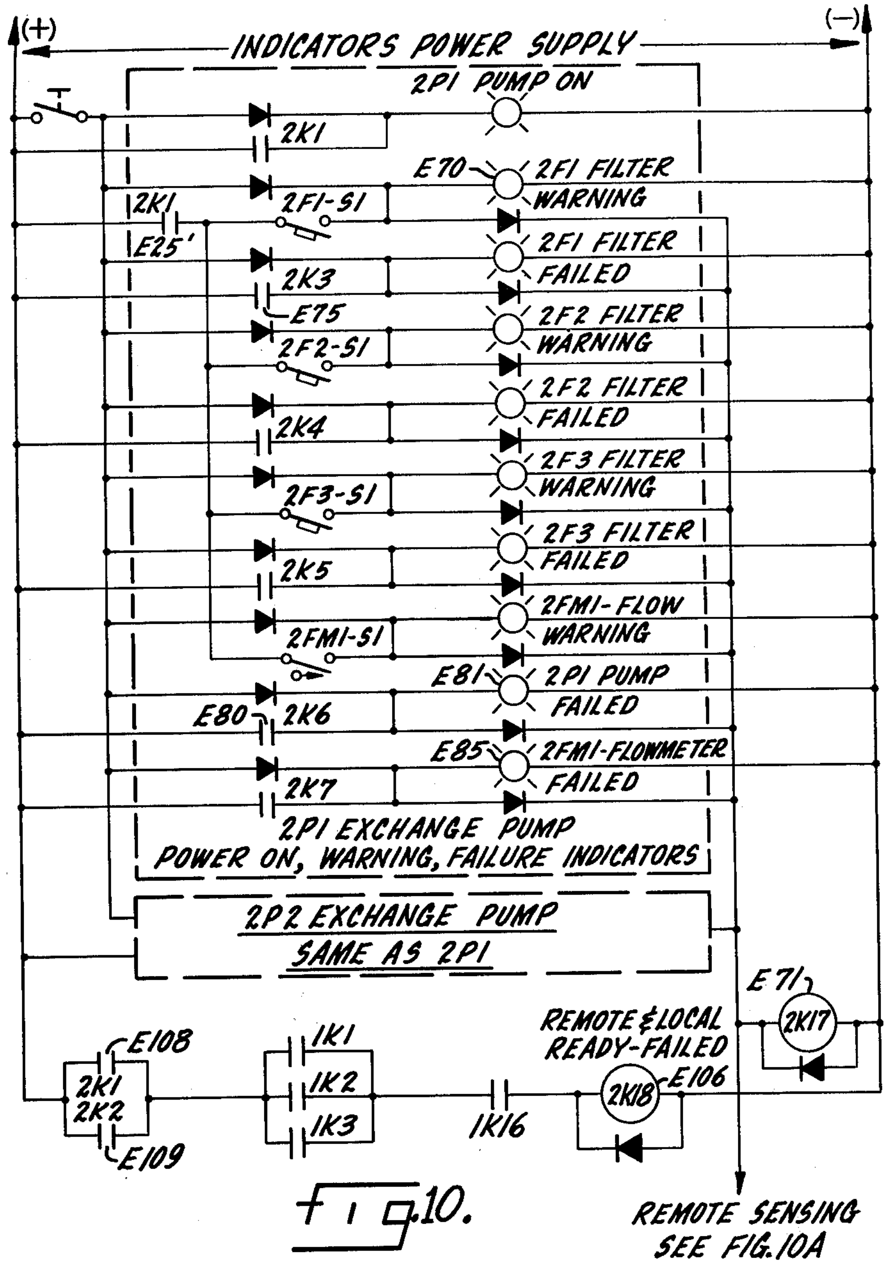

Referring to FIGS. 10 and 10A, any warning of approaching failure is manifest in a lamp as E70 being lit locally at the pump house (FIG. 10), and remotely as well (FIG. 10A) as for instance by a lamp E102 at the control tower where the yard operator is in charge.

The remote signals, FIG. 10A, include a lamp E103 identified with "system failed" and another lamp E104 signifying the system is in a normal mode.

Lamp E103 will be lit (and E104 extinghished) as long as relay E106, FIG. 10, is de-energized; lamp E104 will be lit (and E103 extinguished) if relay E106 is energized.

Thus, if the yard pressure is inadequate, contacts 1K16, FIG. 10, will remain open and lamp E103 will remain lit.

If both exchange pumps fail, both sets of contacts E108 and E109, FIG. 10, are open; relay E106 is de-energized and lamp E103 is thereupon lit to show a failed system; contra if one exchange pump is working in the normal mode.

If all three pressure pumps fail, the circuit for relay E106 is open at 1K1-1K2-1K3, FIG. 10, and lamp E103 is lit; contra if one pressure pump is in working order.

I claim:

1. In a hydraulic system where filtered oil in a reservoir is to be delivered under pressure by a plurality of pressure pumps to a remote location and returned to the reservoir, reservoir apparatus comprising:

a first tank for receiving the return oil;

a second tank for containing filtered oil to be delivered;

at least three pressure pumps communicating with respective pump inlet ports in the second tank for delivering oil in the second tank to the remote location;

two of the pressure pumps being normally active and one being a normally inactive reserve pump;

said inlet ports being separated from one another by dividers to prevent the suction vortex of one port from overlapping the suction vortex of an adjacent port;

a return conduit terminating at an opening in the first tank for feeding return oil to the first tank;

an exchange pump connected with an exchange pump inlet in the first tank for transferring oil from the first tank to the second tank through a transfer conduit having an outlet in the second tank, said transfer conduit having a filter between the exchange pump and second tank to filter oil delivered by the exchange pump to the second tank;

and a plurality of baffles interposed between the inlet ports in the second tank and said outlet in the second tank to remove turbulence from the transfer oil entering the second tank.

2. Reservoir apparatus according to claim 1 having a plurality of baffles in the first tank interposed between the outlet of the return conduit and the inlet to the exchange pump to remove turbulence from oil returned to the first tank.

3. Reservoir apparatus according to claim 2 in which the return oil and transfer oil enter their respective tansk through respective diffusers.

4. Reservoir apparatus according to claim 1 in which the exchange pump transfers oil to the second tank in a greater volume than is delivered by the pressure pumps so as to maintain oil in the second tank at a level higher than in the first tank, and overflow pipes for returning overflow oil in the second tank to the first tank.

5. Reservoir apparatus according to claim 1 having a silt pump which withdraws oil from the second tank, delivers withdrawn oil directly to a silt filter and returns the silt-filtered oil directly to the second tank.

6. Reservoir apparatus and a related hydraulic system according to claim 1, further including:

a plurality of exchange pumps, at least one to be a normally active pump and one to be a normally inactive reserve pump;

a plurality of filter units, one for each pressure pump and one for each exchange pump, and to which the related pump delivers fluid under pressure;

and means to sense the pressure drop across each filter unit and to activate a reserve pump while deactivating an active pump in the event the pressure drop exceeds a predetermined value characterizing unacceptable filter efficiency.

7. Apparatus according to claim 6 including additional means to sense the pressure drop across each filter unit and to generate a signal when the pressure drop indicates a filter unit is approaching unacceptable efficiency.

8. Apparatus according to claim 7 including a flow meter to measure flow rate of each pump, and means responsive to insufficient flow rate to activate the reserve pump and deactivate the active pump.

9. Apparatus according to claim 8 including means responsive to a failed flow meter to deactivate the active pump and activate the reserve pump.

10. Apparatus according to claim 6 including a flow meter to measure the flow rate of each pump, and means responsive to insufficient flow rate to activate the reserve pump and deactivate the active pump.

11. Apparatus according to claim 10 including means responsive to a failed flow meter to deactivate the active pump and activate the reserve pump.

12. In a hydraulic system where filtered oil in a reservoir is to be delivered under pressure by a pressure pump to a remote location and returned to the reservoir, reservoir apparatus comprising:

a first tank for receiving the return oil;

a second tank for containing the oil to be delivered;

a pressure pump communicating with a pump inlet port in the second tank for delivering oil in the second tank to the remote location;

a return conduit terminating at an opening in the first tank for feeding return oil to the first tank;

an exchange pump connected with an exchange pump inlet in the first tank for transferring oil from the first tank to the second tank through a transfer conduit having an outlet in the second tank and having a filter interposed between that outlet and the exchange pump;

a plurality of baffles interposed between the inlet port in the second tank and said outlet in the second tank to remove turbulence from the transfer oil entering the second tank;

and a plurality of baffles in the first tank interposed between the opening of the return conduit and the inlet to the exchange pump to remove turbulence from the oil returned to the first tank.

13. Reservoir apparatus according to claim 12 in which the exchange pump transfers oil to the second tank in a greater volume than is delivered by the pressure pump so as to maintain oil in the second tank at a level higher than in the first tank, and an overflow for returning overflow oil in the second tank to the first tank.

14. Reservoir apparatus according to claim 12 having a silt pump which withdraws oil from the second tank, delivers withdrawn oil directly to a silt filter and returns the silt-filtered oil directly to the second tank.

15. Reservoir apparatus according to claim 12 in which the return oil and transfer oil enter their respective tanks through respective diffusers.

16. Reservoir apparatus according to claim 15 in which the exchange pump transfers oil to the second tank in a greater volume than is delivered by the pressure pump so as to maintain oil in the second tank at a level higher than in the first tank, and an overflow for returning overflow oil in the second tank to the first tank.

17. Reservoir apparatus according to claim 16 having a silt pump which withdraws oil from the second tank, delivers withdrawn oil to a silt filter and returns the silt-filtered oil to the second tank.

* * * * *